US010633090B2

(12) United States Patent
Lord

(10) Patent No.: US 10,633,090 B2
(45) Date of Patent: Apr. 28, 2020

(54) CROSS FLOW FAN WITH EXIT GUIDE VANES

(71) Applicant: UNITED TECHNOLOGIES CORPORATION, Farmington, CT (US)

(72) Inventor: Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 617 days.

(21) Appl. No.: 15/072,657

(22) Filed: Mar. 17, 2016

(65) Prior Publication Data

US 2017/0267342 A1   Sep. 21, 2017

(51) Int. Cl.

| B64C 39/00 | (2006.01) |
|---|---|
| F04D 17/04 | (2006.01) |
| B64C 11/00 | (2006.01) |
| B64C 21/02 | (2006.01) |
| B64C 23/02 | (2006.01) |

(52) U.S. Cl.
CPC .......... *B64C 39/005* (2013.01); *B64C 11/006* (2013.01); *B64C 21/025* (2013.01); *B64C 23/02* (2013.01); *F04D 17/04* (2013.01); *B64C 2230/04* (2013.01)

(58) Field of Classification Search
CPC ............................... B64C 39/005; F04D 17/04
See application file for complete search history.

(56) References Cited

U.S. PATENT DOCUMENTS

| 3,065,928 | A | * | 11/1962 | Dornier | .................. | B64C 23/08 |
|---|---|---|---|---|---|---|
|  |  |  |  |  |  | 244/10 |
| 3,082,976 | A | * | 3/1963 | Dornier | .................... | B60V 3/08 |
|  |  |  |  |  |  | 114/67 A |
| 3,178,131 | A | * | 4/1965 | Laing | ..................... | B64C 23/02 |
|  |  |  |  |  |  | 244/15 |
| 3,212,735 | A | * | 10/1965 | Laing | ................... | B64C 11/001 |
|  |  |  |  |  |  | 244/56 |
| 3,249,292 | A | * | 5/1966 | Eck | ....................... | A45D 20/10 |
|  |  |  |  |  |  | 415/148 |
| 3,291,420 | A | * | 12/1966 | Laing | ................... | B64C 23/005 |
|  |  |  |  |  |  | 244/208 |

(Continued)

FOREIGN PATENT DOCUMENTS

| EP | 3219606 A1 | 9/2017 |
|---|---|---|
| WO | 2006116072 A1 | 11/2006 |
| WO | 2014209198 A1 | 12/2014 |

OTHER PUBLICATIONS

Gossett, Dean H. "Investigation of Cross Flow Fan Propulsion for Lightweight VTOL Aircraft." Dec. 2000. Thesis. Naval Postgraduate School, Monterey, California. 88 pages. (Year: 2000).*

(Continued)

*Primary Examiner* — Philip J Bonzell
*Assistant Examiner* — Michael B. Kreiner
(74) *Attorney, Agent, or Firm* — Carlson, Gaskey & Olds, P.C.

(57) ABSTRACT

A cross flow fan to be incorporated into an aircraft comprises a cross flow fan rotor to be positioned in an aircraft, a drive arrangement for the cross flow fan rotor, and a plurality of vanes positioned downstream of the cross flow fan rotor. An aircraft is also disclosed.

18 Claims, 4 Drawing Sheets

(56) References Cited

U.S. PATENT DOCUMENTS

| | | | |
|---|---|---|---|
| 3,295,750 A * | 1/1967 | Laing | F04D 17/04 415/53.1 |
| 3,322,333 A * | 5/1967 | Laing | F04D 17/04 415/53.1 |
| 3,334,699 A | 8/1967 | Trillo | |
| 3,437,262 A * | 4/1969 | Eck | A45D 20/10 415/148 |
| 3,460,647 A * | 8/1969 | Laing | B60V 1/00 180/119 |
| 4,194,707 A * | 3/1980 | Sharpe | B64C 3/141 244/12.3 |
| 5,636,702 A * | 6/1997 | Kolacny | B60V 1/22 180/117 |
| 6,016,992 A * | 1/2000 | Kolacny | B64C 3/50 244/10 |
| 6,231,004 B1 * | 5/2001 | Peebles | B64C 23/08 244/10 |
| 6,527,229 B1 * | 3/2003 | Peebles | B64C 3/141 244/10 |
| 7,461,811 B2 * | 12/2008 | Milde, Jr. | B64C 3/56 244/12.3 |
| 7,607,606 B2 * | 10/2009 | Milde, Jr. | B64C 3/56 244/12.3 |
| 7,641,144 B2 * | 1/2010 | Kummer | B64C 3/141 244/12.1 |
| 7,717,368 B2 * | 5/2010 | Yoeli | B64C 27/20 244/12.5 |
| 8,020,804 B2 * | 9/2011 | Yoeli | B64C 27/20 180/117 |
| 8,157,520 B2 * | 4/2012 | Kolacny | F04D 17/04 180/117 |
| 8,448,905 B2 * | 5/2013 | Peebles | B64C 39/005 244/10 |
| 8,548,780 B2 | 10/2013 | Skelly et al. | |
| 8,678,743 B1 | 3/2014 | Sheridan et al. | |
| 8,746,616 B2 | 6/2014 | Barmichev et al. | |
| 8,753,065 B2 | 6/2014 | Sheridan et al. | |
| 8,807,916 B2 | 8/2014 | Sheridan et al. | |
| 8,814,494 B1 | 8/2014 | Sheridan et al. | |
| 8,899,520 B2 | 12/2014 | Barmichev et al. | |
| 9,789,959 B2 * | 10/2017 | Prisell | B64C 15/02 |
| 2002/0139894 A1 * | 10/2002 | Sorensen | B60V 1/08 244/2 |
| 2010/0006695 A1 * | 1/2010 | Aguilar | B64C 29/0008 244/12.5 |
| 2010/0150714 A1 | 6/2010 | Kolacny et al. | |
| 2012/0111994 A1 * | 5/2012 | Kummer | B63G 8/18 244/15 |
| 2016/0009387 A1 | 1/2016 | Kummer et al. | |

OTHER PUBLICATIONS

In re Chitayat, 408 F.2d 475, 56 CCPA 1343, 161 USPQ 224 (1969) (Year: 1969).*
In re Mraz, 455 F.2d 1069, 173 USPQ 25 (CCPA 1972) (Year: 1972).*
In re Olson, 41 C.C.P.A. 871, 212 F.2d 590, 592, 101 USPQ 401, 402 (CCPA 1954) (Year: 1954).*
In re Wilson et al., 312 F.2d 449, 50 CCPA 827 (1963) (Year: 1963).*
In re Wright, 569 F.2d 1124, 1127, 193 USPQ 332, 335 (CCPA 1977) (Year: 1977).*
Hockerson-Halberstadt, Inc. v. Avia Group. Int'l, Inc., 222 F.3d 951, 956 (Fed. Cir. 2000) (Year: 2000).*
https://en.wikipedia.org/wiki/Frigate_Ecojet.
https://www.flightglobal.com/news/articles/analysis-will-boeings-next-aircraft-be-an-oval-or-417256 Copyright 2015.
Thong Q. Dang, et al., "Aerodynamics of cross-flow fans and their application to aircraft propulsion and flow control", Progress in Aerospace Sciences, 45 (2009), pp. 1-29.
European Search Report for European Application No. 17161387.0 dated Jun. 16, 2017.
European Search Report for EP Application No. 19152397.6 dated Mar. 22, 2019.

* cited by examiner

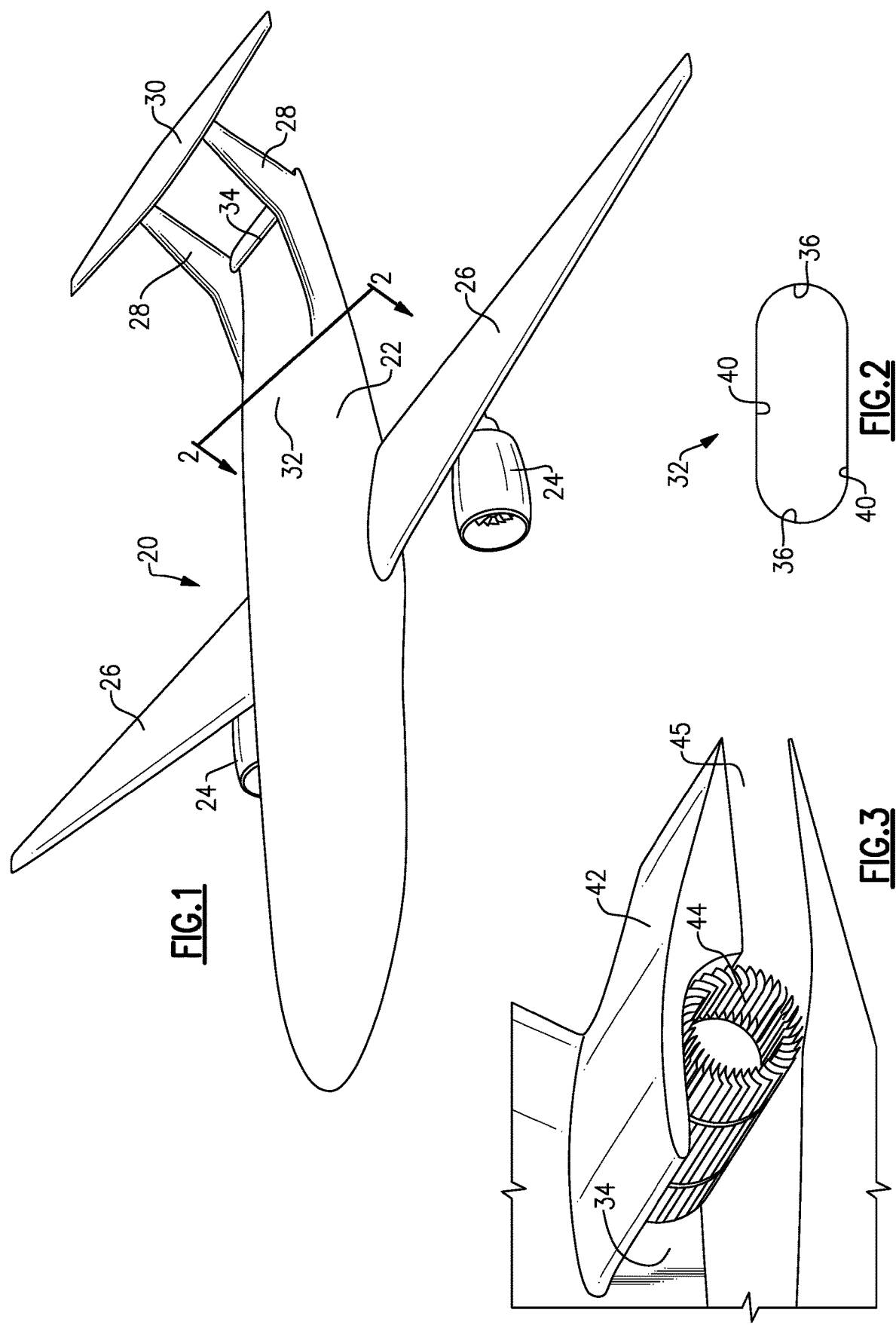

CROSS FLOW FAN WITH EXIT GUIDE VANES

BACKGROUND OF THE INVENTION

This application relates to a cross flow fan to reduce boundary layer air that would otherwise create drag in proposed aircraft bodies having a relatively wide fuselage.

Various aircraft bodies are being developed. Propulsion systems are required to enable various forms of flow control, including boundary layer ingestion, and powered lift.

There is an opportunity to develop integrated propulsion systems.

SUMMARY OF THE INVENTION

In a featured embodiment, a cross flow fan to be incorporated into an aircraft comprises a cross flow fan rotor to be positioned in an aircraft, a drive arrangement for the cross flow fan rotor, and a plurality of vanes positioned downstream of the cross flow fan rotor.

In another embodiment according to the previous embodiment, the plurality of vanes turn the air through distinct angles.

In another embodiment according to any of the previous embodiments, a first vane spaced from a second vane in a direction of rotation of the fan rotor will turn air through a greater angle than the second vane.

In another embodiment according to any of the previous embodiments, vanes intermediate the first and second vane turn the air through angles which are intermediate to the angle of the first vane and the angle of the second vane.

In another embodiment according to any of the previous embodiments, an outlet has a variable area nozzle which may be pivoted to control a cross-section of the outlet.

In another embodiment according to any of the previous embodiments, an outlet has a variable area nozzle which may be pivoted to control a cross-section of the outlet.

In another embodiment according to any of the previous embodiments, the cross flow fan rotor is to be positioned in a tail section of an aircraft fuselage.

In another embodiment according to any of the previous embodiments, the cross flow fan rotor is to be positioned in a wing of an aircraft.

In another embodiment according to any of the previous embodiments, the drive arrangement incorporates at least one electric motor.

In another embodiment according to any of the previous embodiments, an outlet has a variable area nozzle which may be pivoted to control a cross-section of the outlet.

In another featured embodiment, an aircraft comprises an aircraft body, a cross flow fan rotor positioned in the aircraft body, a drive arrangement for the cross flow fan rotor, and a plurality of vanes positioned downstream of the ingestion fan rotor.

In another embodiment according to the previous embodiment, the plurality of vanes turn the air through distinct angles.

In another embodiment according to any of the previous embodiments, a first vane spaced from a second vane in a direction of rotation of the fan rotor will turn air through a greater angle than the first vane.

In another embodiment according to any of the previous embodiments, vanes intermediate the first and second vane turn the air through angles which are intermediate to the angle of the first vane and the angle of the second vane.

In another embodiment according to any of the previous embodiments, an outlet has a variable area nozzle which may be pivoted to control a cross-section of the outlet.

In another embodiment according to any of the previous embodiments, the drive arrangement incorporates at least one electric motor.

In another embodiment according to any of the previous embodiments, an outlet has a variable area nozzle which may be pivoted to control a cross-section of the outlet.

In another embodiment according to any of the previous embodiments, the cross flow fan rotor is positioned in a wing of the aircraft body.

In another embodiment according to any of the previous embodiments, the cross flow fan rotor is incorporated in a tail of the aircraft body.

In another embodiment according to any of the previous embodiments, the aircraft body has a relatively wide cross-sectional area adjacent the tail, and having a width to height ratio greater than or equal to about 1.5.

These and other features may be best understood from the following drawings and specification.

BRIEF DESCRIPTION OF THE DRAWINGS

FIG. 1 shows an embodiment of a proposed aircraft body.

FIG. 2 is a cross-sectional view along line 2-2 of FIG. 1.

FIG. 3 shows an embodiment of a cross flow fan for the aircraft of FIG. 1.

DETAILED DESCRIPTION

Figure 4:
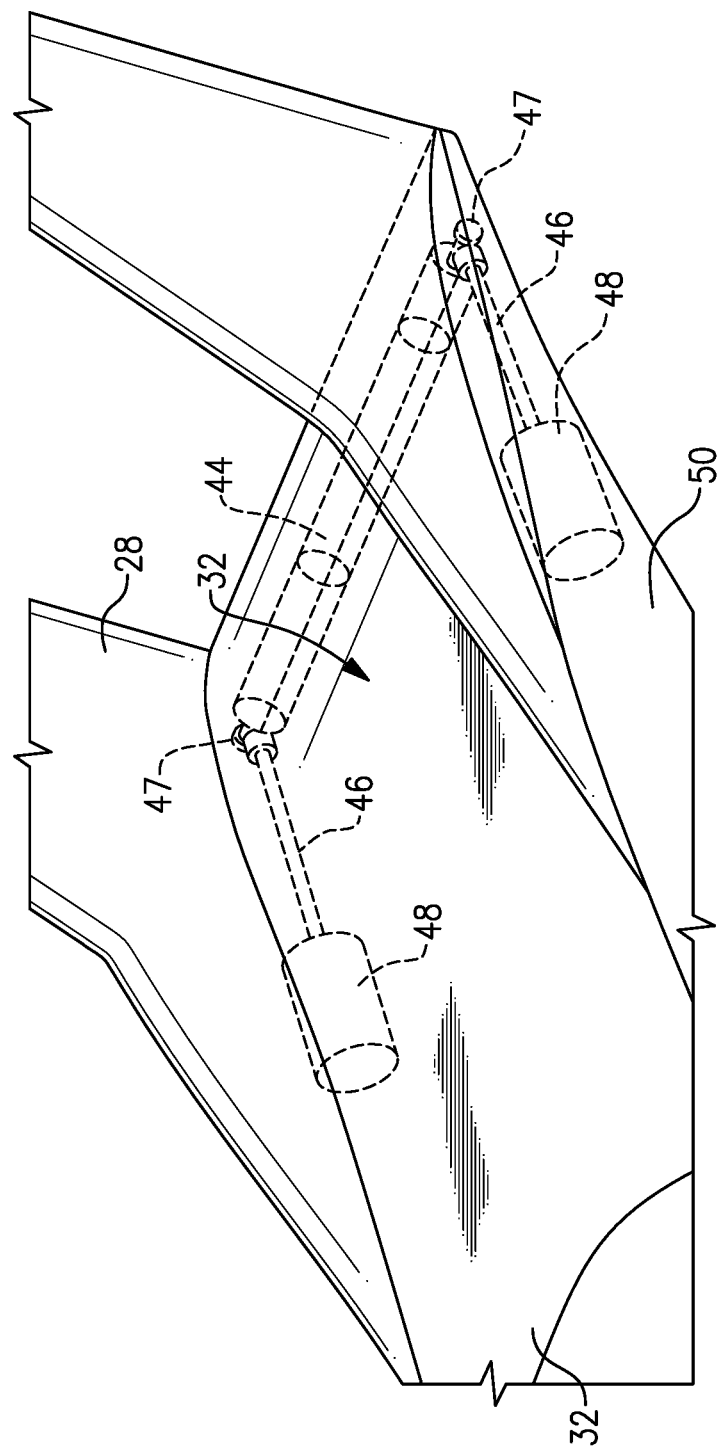
FIG. 4 shows an embodiment of a drive arrangement for the cross flow fan of FIG. 3.

FIG. 1 shows an aircraft body 20 having a fuselage 22 and engines 24 mounted beneath wings 26. The aircraft body 20 is a so-called "double-bubble" aircraft body. Rear stabilizers 28 lead to a tail 30. A fuselage area 32 on top of the aircraft forward of the tail 30 is relatively wide. In this disclosure, an air intake 34 leads to a cross flow fan to energize boundary layer air, reducing wake dissipation and improving overall propulsive efficiency.

FIG. 2 is a cross-sectional view along line 2-2 of FIG. 1. The fuselage is not generally cylindrical in cross section. This differs from the prior art conventional tube+wing aircraft in which the fuselage is basically a cylindrical tube. The noncylindrical fuselage has a horizontal width significantly greater than its vertical height. This configuration may be achieved with a double bubble, which is essentially two cylinders blended together in the horizontal direction, or more generally any elongated or elliptical cross section that has width to height ratio significantly greater than unity. In embodiments, the ratio is greater than or equal to about 1.5. The flattened non-cylindrical fuselage shape has several potential advantages. It has less external wetted surface area for a given number of passengers compared to the cylindrical cross section, thus lowering aerodynamic drag. The flattened fuselage shape may be able to carry some lift, thus reducing the amount of lift required from the wings and the associated wing area. A further advantage that pertains to the present disclosure is that the flattened fuselage may close out at the back end to a flat beavertail shape with a trailing edge of finite width. The fuselage boundary layer may then be ingested into a high aspect ratio rectangular "mail slot" inlet arranged near the trailing edge of the beavertail between the vertical stabilizers 28. As shown, the fuselage in the area 32 is not generally cylindrical in cross-section, as in the case in standard aircraft today. Rather, there are opposed semicircular portions 36 separated by a generally straight area 40. Thus, there are more circular sides and less curved central areas 40. This results in a wide fuselage.

FIG. 3 shows details of the intake 34. As shown, a top 42 of the fuselage is spaced above a fan 44. The fan is a transverse axis fan, also known as a cross flow fan. Fan 44 will drive the air to an outlet 45 rearward of the aircraft. The cross flow fans can be seen to take air in at an inlet, and then move that air to an outlet which is circumferentially spaced from the inlet.

FIG. 4 shows the fan 44 being driven by electric motors 48. Motors 48 drive shafts 46 that drive the fan 44 through bevel gears 47. Due to the bevel gears 47, the motors 48 can be positioned off axis relative to the fan 44, and such that the fan 44 is able to remove the boundary layer air across the majority of the width of the fuselage section 32. That is, the motors 48 drive axial ends of fan rotor 44. While two electric motors are illustrated, it may be that only a single motor is necessary. Other drive arrangements may be utilized.

The cross-flow fan of this embodiment will provide propulsion. Still, the bulk of the propulsion for the aircraft will come from the main gas turbine engines. In embodiments, the cross-flow fan may provide 10-25% of the overall propulsion provided in combination with the main gas turbine engines.

Stated another way, there is a combined propulsion provided by the tail mounted fan rotor and the main gas turbine engines in combination. The fan rotor provides greater than or equal to about 10% and less than or equal to about 25% of the total propulsion.

An engine as disclosed within FIGS. 1 through 4 is described and claimed in co-pending U.S. patent application Ser. No. 14/929,876, entitled "Cross Flow Fan for Wide Aircraft Fuselage."

Figure 5:
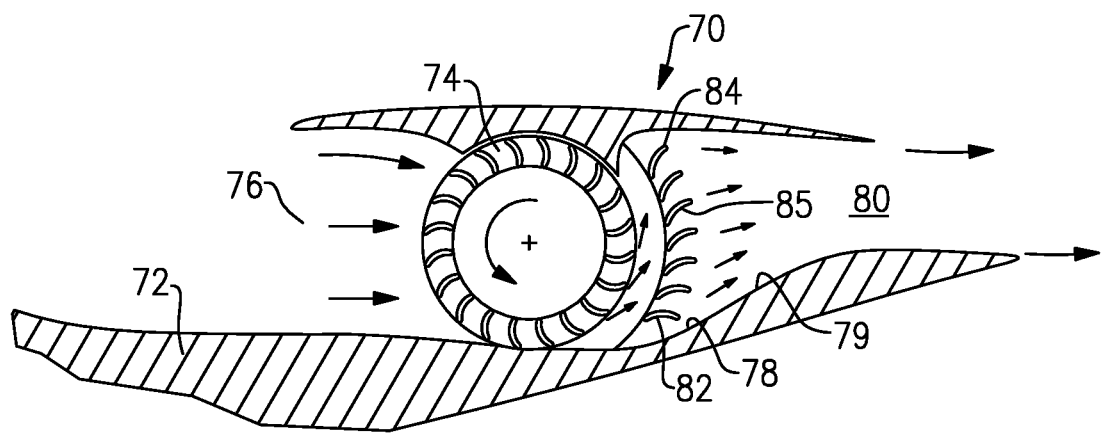
FIG. 5 shows another embodiment of a cross flow fan for the aircraft of FIG. 1.

FIG. 5 shows an alternative arrangement 70 incorporating a fuselage 72 having inlet 76 leading to a cross-flow fan impeller 74. As shown, the airflow leaving the impeller 74 will be generally tangent at each location. An outlet 78 curves from lower location 79 to a central outlet area 80. In general, the curving area 79 curves vertically upwardly to the area 80. A series of vanes 82/84 are positioned intermediate the impeller 74 and the area 80. As can be appreciated from the FIG. 5, the vanes have different camber, with vanes 82 near a lower end tending not to turn the flow, whereas vanes 84 near an upper end tending to turn the flow approximately 90°. Intermediate vanes 85 generally turn the air flow through intermediate angles between 0 and 90°.

Stated another way, the vanes 82-84 turn the air through an increasing angle along a direction of rotation of the fan rotor 74. While this is shown as vertically down in a direction moving vertically upwardly in FIG. 5, the fan rotors could of course rotate in an opposed direction, and the angle of the vanes would then be reversed.

The air is directed in a coherent direction such that there is less disruption to the air flow, and the air flow is utilized more efficiently as propulsion air. The addition of the exit guide vanes to the crossflow fan configuration enables a generally straight-through flowpath from inlet to nozzle that can be integrated with aircraft designed for high flight speeds.

Figure 6:
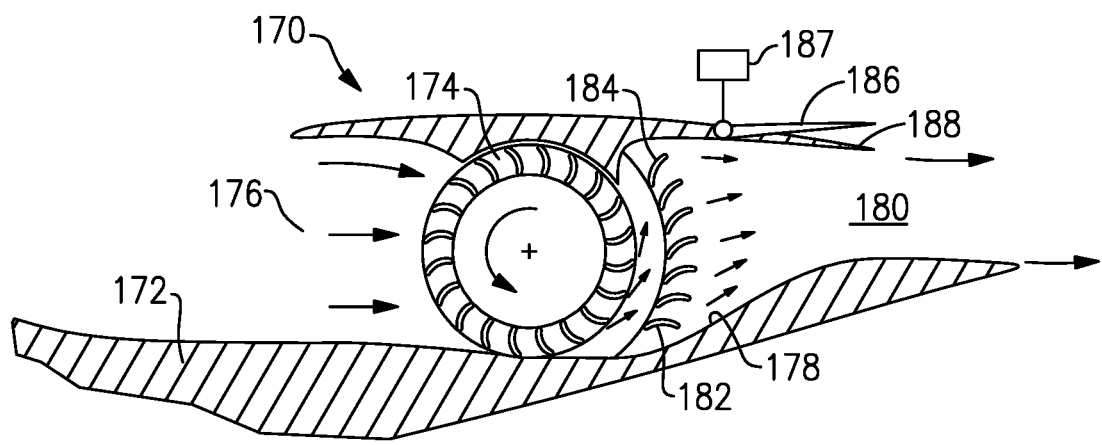
FIG. 6 shows another embodiment of a cross flow fan for the aircraft of FIG. 1.

FIG. 6 shows an embodiment 170 including vanes and other structure similar to the FIG. 5 embodiment, and each including a reference numeral incremented by 100. In this embodiment, a variable area nozzle 186 is positioned to control the area of outlet 180. As shown, the nozzle 186 can be pivoted by a control 187, shown schematically, to a radially restricted position 188. Thus, during off design operation, the control 187 may achieve desired air flow characteristics. The variable area nozzle 186 can be used to modulate mass flow through the cross flow fan at a fixed rotational speed. This may be controlled to maintain fan operation closer to peak efficiency over a range of flight and power conditions.

Figure 7:
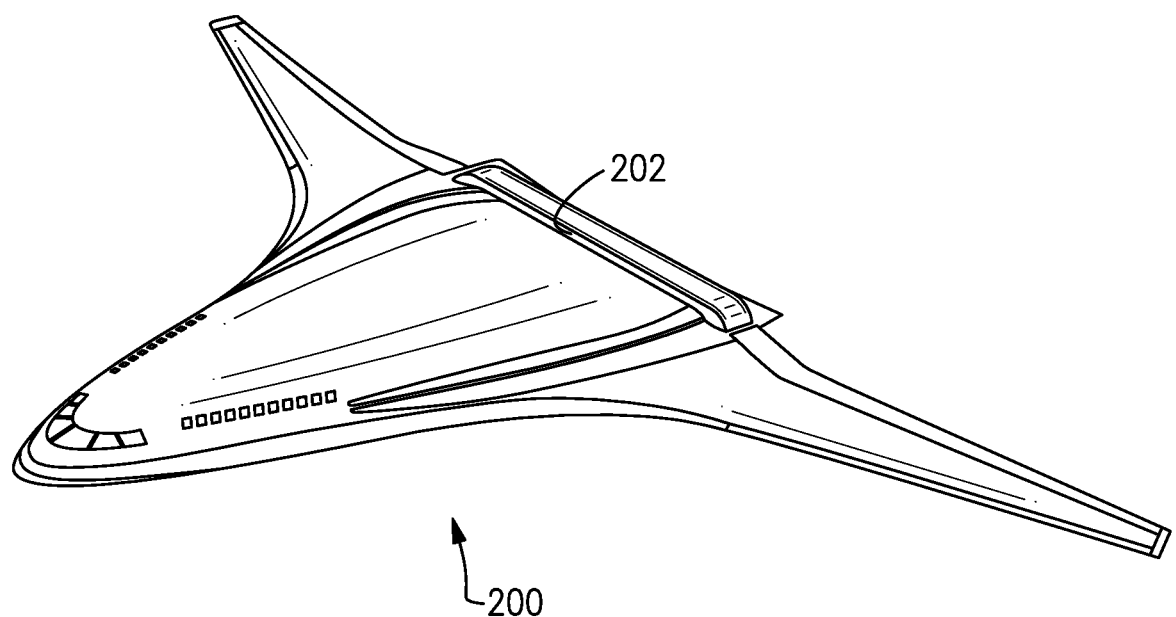
FIG. 7 shows another application for the FIGS. 5 and 6 embodiments.

FIG. 7 shows another application for the embodiments of FIGS. 5 and 6. In this aircraft 200, a cross flow fan 202 may be incorporated into the tail of the vehicle.

Figure 8:
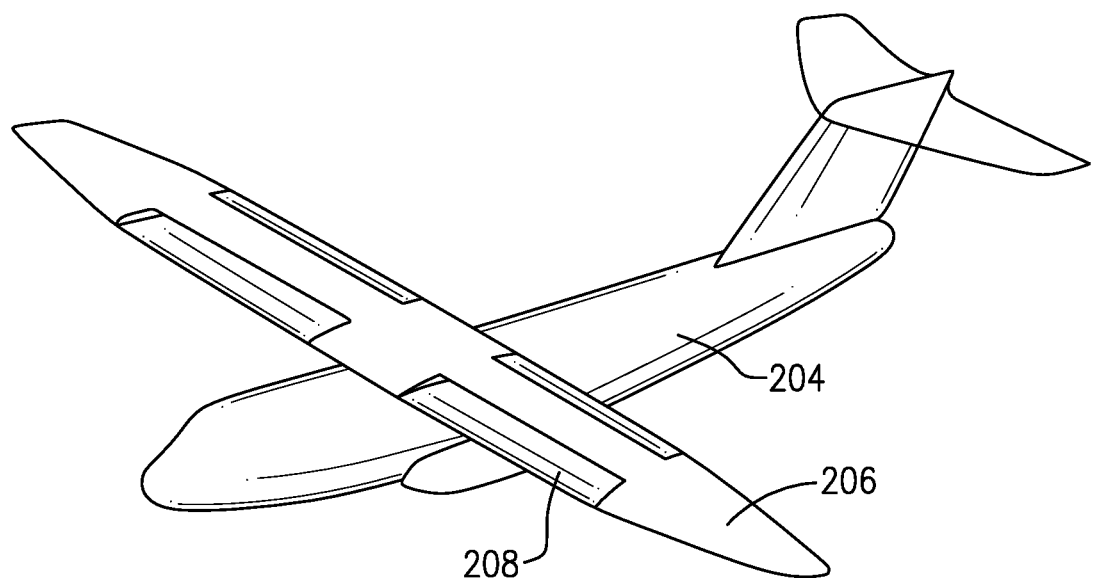
FIG. 8 shows yet another application for the FIGS. 5 and 6 embodiments.

FIG. 8 shows yet another aircraft which may incorporate the embodiments of FIGS. 5 and 6. Here a wing 206 may receive a cross flow fan 208.

A worker of ordinary skill in the art would recognize other beneficial applications.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cross flow fan to be incorporated into an aircraft comprising:
    a cross flow fan rotor to be positioned in an aircraft;
    a drive arrangement for said cross flow fan rotor; and
    a plurality of vanes positioned downstream of said cross flow fan rotor, said plurality of vanes turn air through distinct angles.

2. The cross flow fan as set forth in claim 1, wherein a first vane spaced from a second vane in a direction of rotation of said fan rotor will turn the air through a greater angle than said second vane.

3. The cross flow fan as set forth in claim 2, wherein vanes intermediate the first and second vane turn the air through angles which are intermediate to the angle of the first vane and the angle of the second vane.

4. The cross flow fan as set forth in claim 2, wherein an outlet downstream of said plurality of vanes has a variable area nozzle which may be pivoted to control a cross-section of said outlet.

5. The cross flow fan as set forth in claim 1, wherein an outlet provided downstream of said cross flow fan has a variable area nozzle which may be pivoted to control a cross-section of said outlet.

6. The cross flow fan as set forth in claim 1, wherein said cross flow fan rotor is to be positioned in a tail section of an aircraft fuselage.

7. The cross flow fan as set forth in claim 1, wherein said cross flow fan rotor is to be positioned in a wing of an aircraft.

8. The cross flow fan as set forth in claim 1, wherein said drive arrangement incorporates at least one electric motor.

9. The cross flow fan as set forth in claim 1, wherein an outlet provided downstream of said cross flow fan has a variable area nozzle which may be pivoted to control a cross-section of said outlet.

10. An aircraft comprising:
an aircraft body;
a cross flow fan rotor positioned in said aircraft body;
a drive arrangement for said cross flow fan rotor; and
a plurality of vanes positioned downstream of said cross flow fan rotor, said plurality of vanes turn air through distinct angles.

11. The aircraft as set forth in claim 10, wherein a first vane spaced from a second vane in a direction of rotation of said fan rotor will turn the air through a greater angle than said second vane.

12. The aircraft as set forth in claim 11, wherein vanes intermediate the first and second vane turn the air through angles which are intermediate to the angle of the first vane and the angle of the second vane.

13. The aircraft as set forth in claim 11, wherein an outlet provided downstream of said cross flow fan has a variable area nozzle which may be pivoted to control a cross-section of said outlet.

14. The aircraft as set forth in claim 10, wherein said drive arrangement incorporates at least one electric motor.

15. The aircraft as set forth in claim 10, wherein an outlet provided downstream of said cross flow fan has a variable area nozzle which may be pivoted to control a cross-section of said outlet.

16. The aircraft as set forth in claim 10, wherein said cross flow fan rotor is positioned in a wing of said aircraft body.

17. The aircraft as set forth in claim 10, wherein said cross flow fan rotor is incorporated in a tail of said aircraft body.

18. The aircraft as set forth in claim 17, wherein said aircraft body having a width to height ratio greater than or equal to about 1.5.

* * * * *